(12) United States Patent
Blankenship

(10) Patent No.: US 6,632,531 B2
(45) Date of Patent: Oct. 14, 2003

(54) POROUS PARTICLES, THEIR AQUEOUS DISPERSIONS, AND METHOD OF PREPARATION

(75) Inventor: Robert Mitchell Blankenship, Harleysville, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 10/013,697

(22) Filed: Dec. 13, 2001

(65) Prior Publication Data

US 2002/0110690 A1 Aug. 15, 2002

Related U.S. Application Data

(60) Provisional application No. 60/268,851, filed on Feb. 15, 2001.

(51) Int. Cl.$^7$ ................................................. B32B 5/16
(52) U.S. Cl. .................. 428/402; 428/402.21; 428/407; 427/213.34; 424/408; 525/242; 525/301; 523/122; 523/205; 521/56; 521/140; 264/4.7
(58) Field of Search .................. 428/402, 402.21, 428/407; 427/213.34; 525/301, 242; 424/408; 264/4.7; 523/122, 205; 521/56, 146

(56) References Cited

U.S. PATENT DOCUMENTS

| | | | |
|---|---|---|---|
| 4,933,404 A | 6/1990 | Beckman et al. | 526/207 |
| 5,225,279 A | 7/1993 | Redlich et al. | 428/402.22 |
| 5,237,004 A | 8/1993 | Wu et al. | 525/85 |
| 5,312,882 A | 5/1994 | DeSimone et al. | 526/201 |
| 5,382,623 A | 1/1995 | DeSimone et al. | 524/557 |
| 5,514,759 A | 5/1996 | DeSimone et al. | 526/89 |
| 5,527,865 A | 6/1996 | DeSimone et al. | 526/89 |
| 5,672,667 A | 9/1997 | DeSimone et al. | 526/89 |
| 5,688,870 A | 11/1997 | Wilkinson et al. | 525/244 |
| 5,824,726 A | 10/1998 | DeSimone et al. | 524/424 |
| 5,835,174 A | 11/1998 | Clikeman et al. | 349/86 |
| 5,972,363 A | 10/1999 | Clikeman et al. | 424/408 |
| 5,976,405 A | 11/1999 | Clikeman et al. | 252/299.01 |
| 6,239,224 B1 * | 5/2001 | Mork | 525/242 |
| 6,559,217 B1 * | 5/2003 | Nordal | 524/457 |

FOREIGN PATENT DOCUMENTS

| | | |
|---|---|---|
| EP | 0610039 A1 | 1/1994 |
| EP | 0987293 A1 | 3/2000 |
| WO | WO 96/30417 | 10/1996 |
| WO | WO 00/46281 * | 8/2000 |

OTHER PUBLICATIONS

Cheng et al. Synthesis . . . polymer particles J. Polymer Science 30 (Feb. 1992) No. 2 N.Y.*
Cheng et al., "Synthesis and Characterization of Monodisperse Porous Polymer Particles", Journal of Polymer Science, Part A: Polymer Chemistry Edition 30, No. 2, New York, 1992.

* cited by examiner

Primary Examiner—Leszek Kiliman
(74) Attorney, Agent, or Firm—Carl P. Hemenway

(57) ABSTRACT

A method of forming, by polymerization in an aqueous dispersion at pressures in excess of one atmosphere, a plurality of porous particles having at least one polymeric phase and, additionally, having a pore filling phase containing a fugitive substance is disclosed. Replacement of the fugitive substance with a gas is further disclosed. Gas-filled porous particles and their aqueous dispersions are also disclosed.

27 Claims, No Drawings

POROUS PARTICLES, THEIR AQUEOUS DISPERSIONS, AND METHOD OF PREPARATION

CROSS REFERENCE TO RELATED PATENT APPLICATIONS

This is a non-provisional application of prior pending U.S. provisional application Ser. No. 60/268,851 filed Feb. 15, 2001.

The present invention relates to a method of preparing porous particles using a fugitive substance, and to gas-filled porous particles and their aqueous dispersions.

Air-filled porous particles are valued for their ability to opacify otherwise transparent coatings. This ability to opacify is of particular value when a coating is being applied to a surface of a substrate to hide markings on and coloration of that surface. It is thought that such opacification is achieved in much the same way pigments such as titanium dioxide ($TiO_2$) opacify polymeric coatings into which they are incorporated. Like small particles of $TiO_2$ dispersed in a coating, the air-filled voids scatter light. The scattering of visible light, observable as opacity, is particularly intense when the scattering center, in this case the air-filled pore, is between about 50 nanometers and 1 micron in diameter. The term "hiding power" is used herein to refer to the ability of a given coating to hide the substrate surface to which it is applied. An increase in opacity for a given coating will be observed as an increase in hiding power.

When porous particles are dispersed throughout a dry polymeric coating, the pore or pores in each particle typically contain air. Because the air filled pores behave like $TiO_2$, porous particles can completely, or partially replace pigments like $TiO_2$ in coating compositions for which opacity is a requirement. Replacement of inorganic pigments, such as $TiO_2$, with air has obvious financial and environmental advantages associated with it. As a result, porous particles have been commercially successful as materials that provide hiding power to coatings.

Porous particles are typically produced as aqueous dispersions of particles, the pores of which are filled with water. These aqueous dispersions of particles are incorporated into coating compositions, including a variety of paints. Because the refractive index difference between water and polymer is typically much less than that between air and polymer, or other gases and polymer, the coating composition does not achieve full opacity during application to a substrate and formation of a coating until that coating has dried to the extent that the water in the pores has been replaced with air. It is an unfortunate reality that, although the ultimate "dry hiding power" imparted to a coating by porous particles may be such that it would be fully acceptable to a customer, the lower "wet hiding power" observable during application of the coating may dissuade the customer from proceeding to completion. In this way, for example, a coating composition that replaces all or a portion of $TiO_2$ with cheaper, more environmentally desirable air is often rejected as an option based not upon actual performance of the coating once dry, but rather based upon anxiety experienced by the customer during application.

It is, therefore, desirable to prepare aqueous dispersions of porous particles having pores filled with air, or other gaseous material. In that way, wet hiding power similar to the ultimate dry hiding power of a given coating composition can be achieved.

U.S. Pat. No. 5,225,279 discloses a method of forming porous particles by first dispersing droplets of monomer and other hydrophobic substances in water, followed by polymerization. The polymer formed during the polymerization bears acidic groups such as those of carboxylic acid monomers, and phase separation after polymerization is facilitated by neutralization of those acidic groups with base such as, for example, ammonia. The neutralization converts the carboxylic acid groups, most of which are not ionized, into carboxylate salts that are fully ionized. By making the polymer more ionic, and therefore more hydrophilic, in this way, the polymer is rendered less soluble in the hydrophobic component of the droplet, and phase separation occurs readily. This technique, disclosed in detail in U.S. Pat. No. 5,225,279, has the further advantage that the more ionic, more hydrophilic polymer bearing, for example, ammonium carboxylate groups will tend to move to the droplet/water interface, increasing the propensity to form a continuous shell around a single pore containing the more hydrophobic phase. Similarly, polymers bearing salt moieties may be formed by neutralization of basic groups on those polymers. For example, amine functional polymers may be neutralized with hydrochloric acid or acetic acid to form more hydrophilic ionic polymers. Because dispersion of the droplets prior to polymerization is accomplished exclusively by mechanical means, the particle size distribution of both droplets and porous particles is broad. When a volatile solvent is included in the droplets as a hydrophobic substance, polymerization and neutralization produces porous particles which may be separated from the aqueous phase and dried, creating air-filled particles having a broad particle size distribution.

U.S. Pat. No. 5,976,405 discloses porous particles having particle sizes in the range of 0.150 micron to 15 microns, and very narrow particle size distributions that derive from using a low molecular weight seed polymer, itself having a very narrow particle size distribution. This method does not require neutralization after polymerization, although neutralization may be a preferred option in some cases. When a volatile solvent is included in the droplets as a hydrophobic substance, polymerization and phase separation produces porous particles which may be separated from the aqueous phase and dried, creating air-filled particles having a very narrow particle size distribution. Unfortunately, neither U.S. Pat. No. 5,976,405 nor U.S. Pat. No. 5,225,279 disclose air-filled particles dispersed in water.

Displacement by air of a solvent contained in a pore, while a particle is still dispersed in water, is extremely difficult or impossible. Attempts to remove low boiling solvents (i.e., solvents having a normal boiling point of 30° C. to 70° C.) from the pores of porous particles having continuous shells is very difficult when those particles are dispersed in water, even at reduced pressure and elevated temperature. At reduced pressure, the amount of gas (e.g., nitrogen or air) available to replace the solvent is very limited and the diffusion of the gas through the aqueous phase slows the replacement process further. As a result, solvent escaping from the pore is not easily replaced with gas. The partial vacuum thus created in the pore may then bring about collapse of the particle, with concomitant change in particle shape, and loss of the desired porosity. If, on the other hand, elevated temperatures are used to encourage evaporation of the solvent, it is often the case that the required temperature for efficient evaporation is at least as high as the softening temperature of the polymeric phase, with the result that the desired porous structure is lost.

We have, surprisingly, found that it is possible to prepare aqueous dispersions of porous particles having a polymeric phase filled with at least one gaseous substance, for example, air. The method of preparation of these porous particles involves the use of a fugitive substance during polymerization. The fugitive substance can then be removed smoothly and continuously at temperatures as low as 1° C. above the freezing point of the aqueous phase, allowing even porous particles having a polymeric phase which softens at least 5° C. above the freezing point of the aqueous phase to be freed of the fugitive substance without loss of porosity, and without loss of shape.

Polymeric particles having pores filled with gas may be prepared according to the method of the present invention in a wide range of particle sizes (PS) spanning 0.015 microns to at least 250 microns, and particle size distributions (PSDs) including broad, narrow, very narrow, monodisperse, bimodal, and multimodal.

The present invention relates to a method of preparing an aqueous dispersion of a plurality of porous particles, wherein said porous particles comprise at least one polymeric phase and a pore filling phase, comprising the steps of:

a) forming a reaction mixture in a closed pressure vessel, said reaction mixture comprising:
   i) at least one monomer;
   ii) water;
   iii) a dispersing agent; and
   iv) at least one fugitive substance;
b) forming a plurality of droplets comprising said monomer and said fugitive substance as a dispersed phase in water;
c) polymerizing said monomer to form said polymeric phase;
d) causing said polymeric phase and said pore filling phase to phase separate from one another, forming said porous particles; and
e) reducing the pressure in said pressure vessel to atmospheric pressure; and wherein said pore filling phase comprises said fugitive substance.

Another aspect of the method of the present invention comprises the further step of at least partially replacing the fugitive substance with a replacement gas.

Yet another aspect of the method of the present invention comprises the step of forming a plurality of seed particles by at least one aqueous emulsion polymerization of at least one seed monomer; and
wherein said reaction mixture further comprises said seed particles.

A still further aspect of the method of the present invention comprises the steps of:

(1) forming a plurality of pre-seed particles by aqueous emulsion polymerization of at least one pre-seed monomer; and
(2) forming a plurality of seed particles by at least one aqueous polymerization of at least one seed monomer in the presence of said pre-seed particles;
   wherein the seed polymer formed by said polymerization of said seed monomer has a number average molecular weight of 500 to 50,000; and
wherein said reaction mixture further comprises said seed particles.

In yet another aspect of the method of the present invention, said polymerizing is carried out at a pressure greater than the critical pressure of said fugitive substance and at a temperature greater than the critical temperature of said fugitive substance.

The present invention also relates to an aqueous dispersion of a plurality of porous particles, said porous particles comprising:

a) at least one polymeric phase; and
b) a pore filling phase;
wherein said pore filling phase comprises a substance selected from the group consisting of a fugitive substance, a replacement gas, and combinations thereof.

The present invention additionally relates to a plurality of porous particles, said porous particles comprising:

a) at least one polymeric phase; and
b) a pore filling phase;
   wherein said pore filling phase is selected from the group consisting of a fugitive substance, a replacement gas, and combinations thereof; and
wherein the effective glass transition temperature of the polymeric phase is 1° C. to 50° C.

Used herein, the following terms have these meanings:

A "dispersed phase" is any phase dispersed in the aqueous phase. "Dispersed phases" include, for example, droplets, porous particles, seed particles, and pre-seed particles. An "aqueous dispersion" includes an "aqueous phase" and at least one "dispersed phase".

The "droplet medium" is the contents of the plural droplets at the start of and during polymerization to form the plural porous particles.

A "plurality" of droplets or particles, including porous particles, refers to a collection of more than one, and usually a large number, of such droplets or particles. The terms "plural droplets" and "plural particles" refer to such collections of droplets and particles, respectively.

The "reaction mixture" is the total contents of the pressure vessel that is present during the polymerization.

A "porous particle" is a particle having at least one polymeric phase and one or more pores.

A "pore" is a space within the porous particle, the boundaries or walls of which are defined completely, or partially by the polymeric phase of that particle.

The "fugitive substance" of the present invention is any substance having a normal boiling point of less than 30° C., preferably less than 10° C., more preferably less than −10° C., and most preferably less than −50° C. The fugitive substance may be soluble in water under conditions of polymerization and removal of the fugitive substance, provided that it is also soluble in the droplet medium. It is preferred that the fugitive substance be more soluble in the droplet medium than in the aqueous phase. The solubility of the fugitive substance in water at the temperature of the polymerization is typically less than 30%, preferably less than 10%, more preferably less than 2%, and most preferably less than 0.5% by weight, based on the total weight of water. The fugitive substance of the present invention is further a substance that is not reactive with the other ingredients of the reaction mixture under the conditions utilized for polymerization and removal of the fugitive substance.

A "pore filling phase" is a phase that includes a fugitive substance, a replacement gas, or a combination thereof.

The "normal boiling point" of a substance is the temperature at which the vapor pressure of that substance equals the atmospheric pressure (i.e., 760 mm) at sea level.

A "dispersing agent" is a substance that functions to stabilize droplets and porous particles in aqueous media. Surfactants and suspending agents are types of dispersing agents.

A "porogen" is that portion of the droplet medium from which the polymeric phase separates during or after polymerization. The "porogen" may include a fugitive substance, monomers, other compounds associated with the polymerization, or combinations thereof A "replacement gas" is any substance that is a non-reactive gas under conditions of storage and use of the aqueous dispersion of the plural porous particles, and under conditions of storage and use of the plural porous particles in dry form. The "replacement gas" is added to the aqueous dispersion subsequent to polymerization to replace, or partially replace the fugitive substance.

"Particle size" is the diameter of a particle.

The "average particle size" determined for a collection of droplets or particles, including porous particles, varies somewhat according to method of determination (e.g., by DCP or BI-90, as described herein below), but is approximately, or identically, "the weight average particle size", "$d_w$", also described herein below. "Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook*, edited by J. Brandrup and E. H. Immergut, Interscience Publishers. The Tg of a polymer is calculated by using the Fox equation (T. G. Fox, Bull. *Am. Physics Soc.*, Volume 1, Issue No. 3, page 123 (1956)).

"Effective Tg". When a substance having some degree of solubility in a polymer is imbibed by that polymer, the softening temperature of the polymer decreases. This plasticization of the polymer can be characterized by measuring the "effective Tg" of the polymer, which typically bears an inverse relationship to the amount of solvent or other substance contained in the polymer. The "effective Tg" of a polymer containing a known amount of a substance dissolved within is measured just as described above for "Tg". When the imbibed substance is a fugitive substance, the DSC instrument must be outfitted with a pressure chamber. Alternatively, an estimate of the "effective Tg", which may be particularly useful when the effect of a fugitive substance is to be determined, can be made by placing pieces of polymer having a specific non-spherical shape (e.g., rectangular parallelepipeds having length, width, and height of 6 mm, 2 mm, and 3 mm, respectively) in a pressure vessel and contacting the polymer with a known amount of fugitive substance, at an elevated pressure. The contents of the closed pressure vessel can then be heated to a temperature estimated to be near the effective Tg, held at that temperature for a period of time sufficient to allow penetration of the polymer by and equilibration with the fugitive substance (usually approximately one hour), and then cooled. Opening the vessel then reveals whether or not the pieces have curled or perhaps even formed into a spherical geometry. If the pieces have retained their shape, the temperature chosen was below the effective Tg of the plasticized polymer. Pieces that have completely lost their shape indicate that the peak temperature was above the effective Tg of the plasticized polymer. A few repetitions of this process provide a practical estimate of effective Tg.

Molecular Weight. Synthetic polymers are almost always a mixture of many different molecular weights, i.e. there is a "molecular weight distribution", abbreviated "MWD". For a homopolymer, members of the distribution differ in the number of monomer units which they contain. This idea also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is at hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i / \Sigma(W_i/M_i) = \Sigma(N_i M_i)/\Sigma N_i$$

where:
$M_i$ = molar mass of $i^{th}$ component of distribution
$W_i$ = weight of $i^{th}$ component of distribution
$N_i$ = number of chains of $i^{th}$ component and the summations are over all the components in the distribution. $M_w$ and $M_n$ are typically computed from the MWD as measured by Gel Permeation Chromatography (see the Experimental Section).

It may be advantageous to carry out the polymerization in the plural droplets, and in some cases even remove much of the fugitive substance from the resultant porous particles, under conditions above the critical point of the fugitive substance. Under these conditions, the fugitive substance behaves as a supercritical fluid. Used herein, the terms "supercritical" and "supercritical fluid" have their conventional meanings in the art. A supercritical fluid ("SCF") is a substance above its critical temperature and critical pressure (i.e., its "critical point"). Compressing a gas normally causes a phase separation and the appearance of a separate liquid phase. However, if the fluid is in a supercritical state, compression will only result in density increases. Above the critical point, further compression does not cause formation of a liquid. The critical temperatures, critical pressures, and therefore critical points of a wide range of substances have been determined or calculated, and are available in such references as *Lange's Handbook of Chemistry*, $14^{th}$ Edition, John A. Dean editor, McGraw-Hill, pp. 134 to 147 and *Phase Behavior of Polymers in Supercritical Fluid Solvents*, Chem. Rev., 1999, 99, pp. 565–602.

As is appreciated in the art, all gases have a "critical temperature" above which they cannot be liquified by increasing pressure. Further, there is a "critical pressure" defined as the minimum pressure required to liquify a gas at its critical temperature. For example, carbon dioxide can exist in a solid state (commonly called dry ice), a liquid state, or a gaseous state. However, carbon dioxide may also exist in a supercritical state, a form of matter in which its liquid and gaseous states are indistinguishable from one another. For carbon dioxide, the critical temperature is 31° C. and the critical pressure is 1070 psi (=7,376 kilopascals, kPa). Therefore, carbon dioxide exists as a supercritical fluid at temperatures above 31° C. if the pressure is at least 7,376 kPa. Similarly, any substance will exist as a supercritical fluid at temperatures above its critical temperature if the pressure is at least equal to its critical pressure, unless of course that substance decomposes at a temperature below what would have been the critical temperature had the substance been more stable.

In the present invention, the droplet medium includes a fugitive substance, so it is necessary that the reaction be carried out in a closed pressure vessel. Pressure vessels are well know to those skilled in the art of performing chemical reactions at elevated pressure. Typically the pressure vessel is provided with: ability to withstand reaction conditions without leaking or rupturing; means to agitate its contents; means to heat and cool its contents; means to pressurize and depressurize; means to add ingredients (i.e., addition ports, delivery lines, and reservoirs for ingredients to be added, all designed to withstand the pressures of operation without rupture or leakage); and, if addition of ingredients is required when the pressure inside the vessel is above one atmosphere, means to deliver those ingredients against that interior pressure. The heating means may be, for example, an electric heating furnace to heat the reaction mixture to the desired temperature, and the mixing means includes stirrers such as paddle stirrers, impeller stirrers, or multistage impulse countercurrent agitators, blades, and the like. Delivery of ingredients to a vessel, the inside of which is at elevated pressure, is typically achieved by pressurizing the delivery line to a pressure greater than that of the vessel's interior. This pressurization is typically accomplished by inserting a pressure pump into the delivery line between the ingredient reservoir and the pressure vessel, or by pressurizing the reservoir and delivery line with a compressed inert gas such as, for example, nitrogen or argon.

The polymerization reaction may be carried out at a temperature of 50° C. to 200° C., and is typically carried out at a temperature of −20° C. to 150° C. Suitable antifreeze agents, such as ethylene glycol may be added to the aqueous phase of the reaction mixture to avoid freezing the aqueous phase during reactions which are conducted at temperatures below the freezing point of the aqueous phase in absence of the antifreeze agents. The reaction may be carried out at a pressure ranging from about 100 kPa to about 300,000 kPa, and is typically carried out at a pressure of between about 3,000 kPa and about 70,000 kPa. The polymerization can be carried out batchwise or continuously with thorough mixing of the reactants in any appropriately designed high pressure reaction vessel, or tubular reaction vessel. Components of the reaction mixture other than the fugitive substance may be added to the pressure vessel before or after the vessel is closed. The polymerization may be carried out, for example, by adding monomer, seed polymer, suspending agent, initiator if necessary, and water to the pressure vessel. The vessel would then be closed, pressurized with a fugitive substance, and the contents brought to the polymerization temperature and pressure. Alternatively, only a part of the reaction mixture may be introduced into a pressure vessel and heated to the polymerization temperature and pressure, with additional reaction mixture being pumped in at a rate corresponding to the rate of polymerization. In another possible procedure, a portion of the monomers are initially taken into the closed pressure vessel in the total amount of fugitive substance and the remainder of the monomers or co-monomers are pumped into the pressure vessel together with the initiator at the rate at which the polymerization proceeds. When the polymerization is complete, the aqueous dispersion of porous particles may be brought to atmospheric pressure by, for example, venting the reactor. The porous particles may, for example, be further utilized: as an aqueous dispersion; as an aqueous dispersion combined with other aqueous dispersions containing, for example, a dispersed polymer different from the porous polymer of the present invention; as an isolated powder; and as part of a composite (e.g., a coating) with other materials. Any suitable means of separating the polymer from the fugitive substance and aqueous phase may be employed. Typically, according to the process of the present invention, the fugitive substance is vented to a recycle system and replaced by air. In the event that the fugitive substance is carbon dioxide, the carbon dioxide may be collected for recycle or vented to the atmosphere.

In the method of the present invention, the ingredients that, taken together, form the reaction mixture are added to the pressure vessel. These ingredients include monomer, water, initiator if necessary, dispersing agent, and fugitive substance. Other optional ingredients include a polymeric seed and a transport agent.

Fugitive substances useful in the present invention include, for example, 2,2-dimethylpropane (9.5° C.), dichlorofluoromethane (8.9° C.), cis-2-butene (3.73° C.), trans-2-butene (0.3° C.), 1,2-dichlorotetrafluoroethane (3.8° C.), butane (−0.5° C.), 1-butene (−6.5° C.), 1,1,2,2-tetrafluoroethane (−23° C.), dimethyl ether (−24.8° C.), 1,1-difluoroethane (−25° C.), 1,1,1,2-tetrafluoroethylene (−26.4° C.), hexafluoropropylene (−28° C.), octafluoropropane (−36° C.), chlorodifluoromethane (−40.7° C.), propane (−42.1° C.), propylene (−48° C.), pentafluoroethane (−48.6° C.), difluoromethane (−51.6° C.), sulfur hexafluoride (−63.8° C., sublimes), hexafluoroethane (−78° C.), carbon dioxide (−78° C., sublimes), chlorotrifluoromethane (−81.5° C.), trifluoromethane (−84° C.), ethane (−88° C.), ethylene (−104° C.), tetrafluoromethane (−130° C.), and methane (−161.4° C.). The preferred fugitive substance is a substance selected from the group consisting of 2,2-dimethylpropane, dichlorofluoromethane, 1,2-dichlorotetrafluoroethane, butane, 1,1,2,2-tetrafluoroethane, dimethyl ether, 1,1-difluoroethane, octafluoropropane, chlorodifluoromethane, propane, pentafluoroethane, difluoromethane, sulfur hexafluoride, hexafluoroethane, carbon dioxide, chlorotrifluoromethane, trifluoromethane, ethane, tetrafluoromethane, methane, and combinations thereof. The more preferred fugitive substance is a substance selected from the group consisting of difluoromethane, hexafluoroethane, carbon dioxide, chlorotrifluoromethane, trifluoromethane, ethane, tetrafluoromethane, methane, and combinations thereof. The most preferred fugitive substance is carbon dioxide. Solutions of monomer in the fugitive substance are formed as a plurality of droplets dispersed in water. When the polymer is formed by free radical polymerization of ethylenically unsaturated monomers, a free radical initiator will be one of the ingredients. The initiator may be soluble or partially soluble in the water. However, the initiator is, preferably, chosen to be more soluble in the droplets than in the aqueous phase. The initiator is further chosen to decompose sufficiently quickly at the polymerization temperature that the polymerization is complete within several hours. It is a requirement of the present invention that the polymer be substantially insoluble in the fugitive solvent at some temperature above the freezing point of the aqueous phase so that, at some point during, or subsequent to the polymerization, it will form a separate polymeric phase. In this way, porous particles are formed.

Polymerization of monomers occurs primarily within the droplet medium, resulting in formation of a polymer. The polymer must then be substantially insoluble in the fugitive substance so that it can phase separate from the fugitive substance to create the structure of the porous particle. If the polymerization temperature is above the Tg of the polymer being produced, it is then necessary to reduce the temperature to below the effective Tg of the polymeric phase so that the polymeric structure will become rigid and then remain intact during and after removal of the fugitive substance by, for example, release of pressure. If the polymerization temperature is below the effective Tg of the polymer being produced, the fugitive substance may be removed at the polymerization temperature, or at any temperature below the effective Tg of the polymer.

Whether the polymerization is carried out above the critical point of the fugitive substance or not, much of the fugitive substance may be removed from the pressure vessel under supercritical conditions, provided the temperature of the contents of the pressure vessel is maintained, or adjusted to a temperature above the critical temperature of the fugitive substance. At some point, of course, enough fugitive substance will have been vented that the pressure in the pressure vessel may drop below the critical pressure, and supercritical conditions will no longer obtain. It is not a requirement of the present invention that removal of the fugitive substance, either partial or complete, be carried out predominantly under supercritical conditions. In fact, it is not a requirement that removal of the fugitive substance be carried out under supercritical conditions at all. It is, however, preferred to carry out the polymerization above the critical point of the fugitive substance. It is further preferred to carry out the removal of the fugitive substance at least partially under supercritical conditions.

Phase separation within the droplets, during or after polymerization, must occur in the method of the present invention to produce porous particles. A discussion of the forces causing phase separation in systems involving polymers, and the structures that result, may be found in an article by Tsai and Torkelson, *Macromolecules* 1990, vol. 23, pp. 4983–4989. Two of the categories for the process of phase separation in systems involving polymers are defined as follows in the art of phase separation, and either one or both are believed to be operative in the method of the present invention. The first category refers to formation of the polymeric phase by phase separation of the polymer from the droplet medium during polymerization. This phenomenon is known as "polymerization induced phase separation", the acronym for which is "PIPS". The second category refers to a polymer that is soluble in the droplet medium at one temperature, but insoluble at another, e,g., lower temperature, such that cooling the droplet medium after polymerization causes formation of a separate polymeric phase. This phenomenon is known as "thermally induced phase separation" ("TIPS"). Used herein, a TIPS process would occur if the polymer were soluble, or partially soluble in the fugitive substance at the temperature of polymerization, yet insoluble at a lower temperature. In that case, the TIPS process could be caused to occur by cooling the contents of the pressure vessel to a temperature at which the polymer would phase separate, and removing the fugitive substance. Without wishing to be bound by theory, it is believed that, provided conditions during or after polymerization result in separation of the polymer from the droplet medium according to PIPS, TIPS, or some combination thereof, porous particles will be formed.

Formation of the polymer may be accomplished by free radical polymerization of ethylenically unsaturated monomers or by condensation polymerization of reactive monomer pairs. Formation of the polymer may also occur by metallocene, atom transfer, or by any other suitable method of polymerization amenable to the conditions just described.

Estimation of whether a given polymer will be soluble in a given fugitive substance may be made according to the well-known methods delineated in D. W. Van Krevelen, *Properties of Polymiers*, 3$^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents and polymers, and can be estimated using the group contribution methods of Van Krevelen. For example, to estimate whether a given polymer will be soluble in a given fugitive substance, one calculates $\delta_t^2$ for the polymer and $\delta_t^2$ for the fugitive substance. If the difference between the two, $\Delta\delta_t^2$, is greater than 25 (i.e., $\Delta\delta_t^2 > 5$), then the polymer should be insoluble in the fugitive substance. These calculations may be used to estimate whether the polymer being formed during polymerization will be insoluble in the fugitive substance and, if so, whether it will phase separate from the droplet medium while unreacted monomer is still present in that droplet medium, or whether that monomer must first be substantially consumed before phase separation will occur.

Separation of the polymeric phase from the other components of the droplet either during or after polymerization produces a porous particle that includes a polymeric phase and one or more pores. A common morphology for the porous particle is one in which a continuous polymeric shell surrounds a single pore. However several other possible morphologies may occur dependent upon the interplay of thermodynamic and kinetic forces within the droplet as it becomes a particle during and after polymerization. The resultant porous particle may have a discontinuous polymeric shell (i.e., a shell having one or more holes) surrounding a single pore. Alternatively, the porous particle may be a continuous or discontinuous polymeric shell around multiple pores that themselves may be closed or may open into one another. The porous particle may, instead, contain the polymeric phase and one or more pores intertwined in a lacy bicontinuous structure. Still another morphology is one in which the polymeric phase separates into one hemisphere of the particle and the fugitive substance separates into the other hemisphere. It is further possible to prepare porous particles by more than one polymerization step. For example, a single pore could be surrounded by multiple concentric polymeric shells, each prepared in a separate polymerization step.

When the polymer formed during the polymerization bears acidic groups such as carboxylic acid, its solubility in the droplet medium may be decreased, thereby augmenting phase separation, by neutralizing the acidic moieties with base such as, for example, ammonia, creating anionic moieties. In this example, the ammonium carboxylate groups that are formed increase the hydrophilicity of the polymer, making it less soluble in the droplet medium. This technique, disclosed in detail in U.S. Pat. No. 5,225,279, has the added advantage that the more hydrophilic polymer bearing the ammonium carboxylate groups will tend to move to the droplet/water interface, increasing the propensity to form a continuous shell around a single pore. Similarly, polymers bearing cationic moieties may be formed by neutralization of basic groups if such groups are present on a polymer chain. For example, amine functional polymers may be neutralized with hydrochloric acid or acetic acid to form more hydrophilic ammonium functional polymers.

The method of the present invention can produce porous particles having sizes in the range 0.150 micron to 250 microns. Herein, "micron" and the symbol "$\mu$" are used interchangeably. When particles of size 0.150$\mu$ to 1.0$\mu$ are formed, techniques known to those skilled in the art of aqueous emulsion polymerization are used to stabilize droplets, to stabilize particles, and to establish average particle size and particle size distribution. In particular, emulsion droplets and particles are stabilized by dispersing agents known as surfactants. When particles of size greater than 1.0$\mu$ to 250$\mu$ are formed, techniques known to those skilled in the art of aqueous suspension polymerization are used to stabilize droplets, to stabilize particles, and to establish average particle size and particle size distribution. In particular, droplets and particles of size greater than $1.0\mu$ to $250\mu$ are stabilized by dispersing agents known as suspending agents. Of course, surfactants may have some utility for droplet and particle stabilization, though usually diminished, above $1.0\mu$, and suspending agents may have some utility, though usually diminished, at and below $1.0\mu$.

Surfactants useful in the method of the present invention are well known to those skilled in the art, and may be found in, for example, Porter, M. R., Handbook of Surfactants, Chapman and Hall, New York, 1991. Examples of useful surfactants for the present invention include ionic surfactants such as, for example, sodium lauryl sulfate, dioctylsulfosuccinate, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride. Amphoteric surfactants may also be useful. Amphoteric surfactants bear both acidic and basic functionality and are well known in the art (see, for example, Amphoteric Surfactants, ed. B. R. Bluestein and C. L. Hilton, Surfactant Series Vol. 12 Marcel Dekker New York, N.Y.(1982)). Fluorinated surfactants such as perfluoro-octanoic acid and salts thereof are also useful, particularly for stabilization of fluoropolymers. Silicon surfactants are also useful, especially for stabilizing siloxane polymers. In addition, monomeric surfactants may be incorporated into the polymer chain during polymerization. For example, these monomeric surfactants impart covalently bound surfactant functionality to polymers: nonylphenoxypropenylpolyethoxylated sulphate, sodium alkyl allyl sulfosuccinate, allyl ammonium lauryl 12 EO phosphate, allyl ammonium linear dodecyl benzene sulfonate, and allyl ammonium lauryl sulfate.

Suspending agents are also well known in the art. Suspending agents are typically water soluble polymers including, for example, polyvinyl alcohol, poly(N-vinylpyrrolidone), carboxymethylcellulose, gelatin, hydroxyethylcellulose, r partially saponified polyvinyl acetate, polyacrylamide, polyethylene oxide, polyethyleneimine, polyvinylalkyl ethers, polyacrylic acid copolymers of polyacrylic acid, and polyethylene glycol.

Choice of size for the porous particle is primarily a function of desired enduse properties. For example, when particles are desired for their ability to scatter visible light, it may be desirable that their pores have sizes in the range of $0.050\mu$ to $1.0\mu$. In cases wherein each particle contains a single pore having its size in that range, the preferred size of each particle would be in the range 0.150 to $2.0\mu$.

In the method of the present invention, an aqueous dispersion of porous particles may be formed wherein the pores contain a pore filling phase which may include the fugitive substance, a replacement gas, or combinations thereof. Under ambient conditions, the contents of the pores may remain gaseous for an extended period of time. The average particle size of the porous particles may be $0.15\mu$ to $250\mu$. It is preferred that the average particle size of the porous particles is $0.15\mu$ to $15\mu$, more preferably, $0.15\mu$ to $10\mu$, and most preferably, $0.15\mu$ to $5\mu$. The porous particles may further be separated from the aqueous dispersion, and dried.

Just as a wide range of particle sizes may be accessed by the method of the present invention, the method may be used to produce porous particles having a wide variety of particle size distributions. Herein, the term "particle size distribution" and the acronym "PSD" are used interchangeably. Polydispersity is used in the art as a measure of the breadth of the PSD. More generally, "polydispersity" is a construct of applied mathematics that may be used to describe the distribution of sizes of any measurable feature common to a plurality of items. Examples of distributions that may be described in this way include the lengths of polymer chains (i.e., molecular weights) and the diameters of particles (i.e., particle sizes). Used herein, "polydispersity" is a description of the distribution of particle sizes for the plural particles of the invention. As such, "polydispersity" and "PSD polydispersity" are used interchangeably. PSD polydispersity is calculated from the weight average particle size, $d_w$, and the number average particle size, $d_n$, according to the formulae:

$$\text{PSD Polydispersity} = (d_w)/(d_n),$$

where $d_n = \Sigma n_i d_i / \Sigma n_i$,
$d_w = \Sigma n_i d_i d_i / \Sigma n_i d_i$, and
where $n_i$ is the number of particles having the particle size $d_i$ The term "monodisperse" refers to a particle size distribution having a polydispersity of exactly 1. If, for example, each of 1000 particles had a particle size of exactly $0.454\mu$, the PSD polydispersity would be 1.000. The average particle size of particles of aqueous dispersions may be determined by light scattering techniques such as are employed by the Brookhaven BI-90 Particle Sizer; by sedimentation methods such as are employed by the Chemical Process Specialists Disc Centrifuge Photosedimentation (DCP) unit (see the Examples section); by optical microscopy and by scanning electron microscopy (SEM). The selection of method is dependent upon the particle size being measured. PSD polydispersity may be conveniently measured for particles having sizes in the range of 0.01 micron to 40 microns using the DCP unit (see the Experimental Section).

Used herein, "broad PSD", "narrow PSD", and "very narrow PSD" are defined as having PSD polydispersities of greater than 1.3, greater than 1.1 to 1.3, and 1.000 to 1.1, respectively. The methods of producing polymeric particles having broad, narrow, and very narrow PSDs are well known in the art of aqueous emulsion and aqueous suspension polymerization. In addition, bimodal and multimodal particle size distributions may be formed by well known methods, including, for example, the use of two or more types of seed particle, each having a different average particle size. Of course, aqueous dispersions and isolated porous particles having bimodal and multimodal PSDs may also be prepared after polymerization by combining separately prepared aqueous dispersions of porous particles, isolated porous particles, or combinations thereof. Combinations of particles differing in composition may also be prepared in this way.

Methods of polymerization that create porous polymeric particles having broad particle size distributions (i.e., PSD polydispersities of 1.3 to at least 10) can be found in U.S. Pat. No. 5,225,279, and are well known in the art. The methods employ mechanical agitation to break up large droplets into smaller droplets. Mechanical agitation inherently produces a broad distribution of particle sizes because there exists no single-sized locus of droplet and particle formation (i.e., no polymeric seed) within the reaction mixture.

When narrow PSDs are desired, it is necessary to first prepare polymeric seeds by methods well known in the art. Those polymeric seed particles are smaller than the porous particles that are seeded by them. The seed particles are themselves formed by aqueous emulsion polymerization from seed monomers in the presence of relatively large amounts of surfactant, with the result that they have narrow PSDs. Used herein, a monomer polymerized to from a seed particle is called a "seed monomer". Although a variety of techniques, such as condensation polymerization, may be used to prepare polymeric seed particles, the preferred method of polymerization is by free radical initiation of monoethylenically unsaturated monomers. Multi-ethylenically unsaturated monomers may also be included at levels of 0.01% to 5%, preferably 0.01 to 0.5% by weight, based on total weight of monomers polymerized to make the seed particles. Used herein, the term "ethylenically unsaturated monomer" may include both "monoethylenically unsaturated monomer" and "multi-ethylenically unsaturated monomer". Alternatively, monomers suitable for condensation polymerization may also be used. Examples of suitable monoethylenically unsaturated, multi-ethylenically unsaturated, and condensation monomers can be found herein below. Monomers added to aqueous systems in which the polymeric seeds are dispersed are imbibed into the seeds, swelling them. For thermodynamic reasons, each polymeric seed particle imbibes an amount of monomer, fugitive substance, and other ingredients, such as initiator, proportional to the amount of seed polymer contained in it. In this way, the PSD of the porous particles formed when the monomers contained in the droplets are polymerized is similar to the PSD of the polymeric seed particles used to nucleate droplet formation. As a consequence, seeding a droplet medium with polymeric seed particles having a narrow PSD results in preparation of larger polymer particles having similarly or identically narrow PSDs. Methods using seed prepared in this way are capable of producing plural porous particles having average particle sizes of $0.150\mu$ to $250\mu$, preferably $0.150\mu$ to $15\mu$, more preferably $0.150\mu$ to $5\mu$, and most preferably $0.150\mu$ to $1.0\mu$. The porous particles thus formed may have PSD polydispersities of 1.05 to 1.3, more preferably 1.05 to 1.2, most preferably 1.1 to 1.2.

When very narrow PSDs are desired, it is necessary to first prepare polymeric "pre-seed particles" from which polymeric "seed particles" can subsequently be prepared. The methods of preparation of both pre-seed and seed particles are described in U.S. Pat. No. 5,237,004 and U.S. Pat. No. 5,976,405, and are well known in the art of emulsion polymerization. Prior to polymerization, droplets containing pre-seed monomer are preferably formed in the presence of relatively high levels of surfactant to assure that the droplets have a very narrow PSD. Polymerization of the pre-seed monomer in these droplets results in polymeric pre-seed particles having a very narrow PSD. Used herein, a monomer polymerized to form a pre-seed particles is called a "pre-seed monomer". Although a variety of techniques, such as condensation polymerization, may be used to prepare polymeric pre-seed particles, the preferred method of polymerization is by free radical initiation of ethylenically unsaturated monomers. When this polymerization is carried out by free radical initiation, at least one ethylenically unsaturated monomer is, preferably, used. The PSD polydispersity of the plural pre-seed particles is 1.000 to 1.2, preferably 1.000 to 1.1, more preferably 1.000 to 1.05, and most preferably 1.000 to 1.01. The pre-seed particles have an average particle size of, preferably, $0.020\mu$ to $0.200\mu$, more preferably, $0.030\mu$ to $0.100\mu$, and, most preferably, $0.40\mu$ to $0.70\mu$. The pre-seed particles are then used as the locus of seed monomer droplet formation in the preparation of low molecular weight seeds having very narrow PSDs. Although a variety of techniques, such as condensation polymerization, may be used to prepare these polymeric seed particles, the preferred method of polymerization is by free radical initiation of ethylenically unsaturated monomers. When this polymerization to form the seed particles is carried out by free radical initiation, at least one ethylenically unsaturated monomer is, preferably, used. A chain transfer agent is present in those droplets during polymerization at a level that assures the number average molecular weight (Mn) of the polymer produced in the polymerization to form the seed particles is 500 to 50,000, preferably 1,000 to 20,000, more preferably 1,000 to 10,000, and most preferably 1,000 to 5,000. All ranges cited herein are inclusive and combinable. The PSD polydispersity of the plural seed particles formed in polymerization seeded by the pre-seed particles is 1.000 to 1.2, preferably 1.000 to 1.1, more preferably 1.000 to 1.01, and most preferably 1.000 to 1.005.

Chain transfer agents such as, for example, mercaptans, polymercaptans, and polyhalogen compounds may optionally be added to the monomers in order to moderate molecular weight. Specific examples include alkyl mercaptans such as t-dodecyl mercaptans and hexanethiol; alcohols such as isopropanol, isobutanol, lauryl alcohol, and t-octyl alcohol; and halogenated compounds such as carbon tetrachloride, tetrachloroethylene, and trichlorbromoethane. For forming the seed particles, the amount of chain transfer agent required may be from about 5 percent to about 20 percent by weight based on the total weight of monomer being polymerized, although amounts above 20 percent may be required depending on the molecular weight desired. Chain transfer agents, typically at levels of 6 percent or less by weight based on the total weight of monomer being polymerized, may also be used to regulate molecular weight during polymerization to produce the polymer that will form the polymeric phase of the porous particle.

The low molecular weight seed particles thus produced typically have average particle sizes of $0.50\mu$ to $0.800\mu$, and are preferably capable of imbibing up to 1000 times their own weight in monomers and other ingredients to produce droplets that are then polymerized to form polymeric particles having similar, and very narrow PSDs. It is convenient to use low molecular weight seed particles of size $0.100\mu$ to $0.800\mu$ to prepare polymeric particles, including the porous particles of the present invention, of size greater than $0.150\mu$ to $3.0\mu$. Preparation of porous particles of average PS greater than $3.0\mu$ may first require preparation of a larger seed. Larger low molecular weight seed particles may be prepared from smaller low molecular weight seed particles by carrying out one or more additional polymerizations of seed monomer in the presence of sufficient suspending agent to stabilize the larger seed particles being formed, and in the presence of sufficient levels of chain transfer agent that polymer of the desired molecular weight is formed. Low molecular weight seed particles of average PS preferably greater than $0.500\mu$ to $10\mu$, more preferably greater than $0.500\mu$ to $5\mu$, and most preferably greater than $0.500\mu$ to $3\mu$ can be made in this manner. The preparation of seed particles having an average PS of $1.0\mu$ or more requires that a suspending agent, such as those already describe supra, be added, typically at 0.1 to 5 weight percent, based on total weight of seed particles being prepared. Use of a suspending agent is necessary to stabilize aqueous dispersions of seed particles having diameters of $1.0\mu$ or more.

When seed particles are used in the method of the present invention, the monomer, fugitive substance, and other ingredients that will be components of the droplet medium during polymerization are added to an aqueous reaction mixture along with the seed particles having a particular PSD, either narrow or very narrow. The monomer, fugitive substance, and other substances may be added to the pressure vessel individually or in combination, and it is often advantageous to emulsify them with water and surfactant prior to, or after addition. These ingredients then move through the aqueous phase and become imbibed into the seed particles, swelling them. For thermodynamic reasons, each polymeric seed particle imbibes an amount of monomer, fugitive substance, and other substances proportional to the amount of seed polymer contained in it. In this way, the PSD of the porous particles formed when the monomers contained in the droplets are polymerized is similar to the PSD of the seed particles used to nucleate droplet formation. As a consequence, seeding a droplet medium with polymeric seed particles having a very narrow PSD results in preparation of larger porous particles having similar, or identical, very narrow PSDs.

It is very difficult or impossible for a substance that is insoluble in water to move through the aqueous phase so that it can reach the surface of the seed particle and be imbibed into that seed particle. Examples of substances that are insoluble in water include most fluorinated monomers, many silicon containing monomers, and some fugitive substances. Used herein, a substance that is water insoluble has a water solubility at 25° C. of less than 1 percent by weight, based on the weight of water. In such cases, it may be advantageous to add a transport agent to the pressure vessel. The use of transport agents is described in detail in U.S. Pat. No. 5,976,405. Used herein, a "transport agent" is a substance that is soluble in water, yet has the ability to complex weakly or strongly with the insoluble substance. The complex that forms is sufficiently soluble in water so that the insoluble substance is transported across the aqueous phase and released at the seed particle. Common solvents and monomers may be useful as transport agents. Particularly useful transport agents are macromolecular organic compounds having a hydrophobic cavity. A "macromolecular organic compound having a hydrophobic cavity" is a polymeric molecule, typically cylindrical or approximately cylindrical, which typically has a hydrophilic exterior but has a hydrophobic interior. Such a compound may be used to transport hydrophobic substances (e.g., fluorinated monomers, silicon containing monomers, and fugitive substances that are insoluble in water) through an aqueous environment, and it may even be used to transport substances that have solubilities in water of 0.001 percent or less. Macromolecular organic compounds having a hydrophobic cavity, useful in the method of the present invention, include cyclodextrin and derivatives thereof; cyclic oligosaccharides having a hydrophobic cavity, such as cycloinulohexose, cycloinuloheptose, and cycloinuloctose; calyxarenes; and cavitands.

If a transport agent is used and the transport agent is macromolecular, cyclodextrins (i.e., cyclodextrin and its derivatives) are the preferred macromolecular organic compounds. The selection of cyclodextrin and derivatives thereof useful in the method of the present invention is determined by the solubility of the cyclodextrin and cyclodextrin derivatives in the aqueous phase, by the similarity in size between the insoluble substance and the hydrophobic cavity of the cyclodextrin, and by the solubility of the species formed by the association of the transport agent with the insoluble substance. Suitable cyclodextrins useful in the method of the present invention include: α-acyclodextrins, β-cyclodextrins, and γ-cyclodextrins. The preferred cyclodextrins are: partially alkyl substituted α-cyclodextrins; partially alkyl substituted β-cyclodextrins; partially alkyl substituted γ-cyclodextrins; and combinations thereof The more preferred cyclodextrins are: partially methyl substituted α-cyclodextrins; partially methyl substituted β-cyclodextrins; partially methyl substituted γ-cyclodextrins; and combinations thereof. The most preferred cyclodextrins are partially methyl substituted β-cyclodextrins. The cyclic oligosaccharides having a hydrophobic cavity, such as cycloinulohexose, cycloinuloheptose, and cycloinuloctose, are described by Takai et al in *Journal of Organic Chemistry*, 59(11), 2967–2975 (1994). The calyxarenes useful in the method of the present invention are described in U.S. Pat. No. 4,699, 966. The cavitands useful in the method of the present invention are described in Italian patent application No. 22522 A/89 and by Moran, et al., in Journal of the American Chemical Society, 184, 5826–28 (1982).

The amount of optional transport agent to be used is partly determined by the composition of the transport agent. If the transport agent is a cyclodextrin, the weight ratio of cyclodextrin to insoluble substance (e.g., a fluorinated monomer) may range from 1:1000 to 10:100 and is preferably from 1:100 to 5:100, more preferably, from 1:100 to 2:100. The lower limit is determined by such things as the desired rate of transport. The upper limit is determined by the required stability of the aqueous system. If the transport agent is a solvent or monomer, the ratio of transport agent to insoluble substance is less critical, and will depend upon the desired particle morphology. If a solvent is used, the ratio of solvent to pore filler may, for example, range from 1:10 to 10:1. A monomer may be used as the transport agent. The amount of monomer used will be determined by the desired amount of polymeric phase, and by whether additional monomer will be used in forming that polymeric phase.

In the method of the present invention, free radical polymerization may be used to prepare the polymer that will become the major component of the polymeric phase of the porous particles. In that case, the polymer is formed by the polymerization of ethylenically unsaturated monomers, and the polymerization is initiated by decomposition of an initiator to form free radicals. The monomers from which the addition polymer is formed may be monoethylenically unsaturated. The polymer may contain, as polymerized units, one or more monoethylenically unsaturated monomers. Examples of these monoethylenically unsaturated monomers include: $C_1$–$C_{22}$ linear or branched chain alkyl (meth)acrylates, bornyl (meth)acrylate, and isobornyl (meth)acrylate; hydroxyethyl (meth)acrylate, hydroxypropyl (meth)acrylate; (meth)acrylamide or substituted (meth) acrylamides; styrene or substituted styrenes; butadiene; vinyl acetate or other vinyl ester; vinyl chloride; vinylidene chloride; N-butylaminoethyl (meth)acrylate, N,N-di (methyl)aminoethyl (meth)acrylate; monomers containing α,β-unsaturated carbonyl functional groups such as fumarate, maleate, cinnamate and crotonate; and (meth) acrylonitrile. Used herein, the word fragment "(meth)acryl" refers to both "methacryl" and "acryl". For example, (meth) acrylic acid refers to both methacrylic acid and acrylic acid, and methyl (meth)acrylate refers to both methyl methacrylate and methyl acrylate.

Acid-functional ethylenically unsaturated monomer may also be present in the aqueous emulsion polymer. Acid-functional monomers useful in the present invention include, for example, (meth)acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid.

Optionally, at least one multi-ethylenically unsaturated monomer may be incorporated into the polymer to provide crosslinking. Useful milti-ethylenically unsaturated monomers include, for example, allyl (meth)acrylate, diallyl phthalate, 1,4-butylene glycol di(meth)acrylate, 1,6-hexanediol di(meth)acrylate, and trimethylolpropane tri (meth)acrylate. The multi-ethylenically unsaturated monomer may be present at 0% to 100%, preferably 0% to 25%, more preferably 0% to 10%, and most preferably 0% to 5% by weight, based on total weight of monomers.

Suitable fluorinated monomers include, but are not limited to: fluoroalkyl (meth)acrylate; fluoroalkylsulfoamidoethyl (meth)acrylate; fluoroalkylamidoethyl (meth)acrylate; fluoroalkyl (meth)acrylamide; fluoroalkylpropyl (meth)acrylate; fluoroalkylethyl poly(alkyleneoxide) (meth) acrylate; fluoroalkylsulfoethyl (meth)acrylate; fluoroalkylethyl vinyl ether; fluoroalkylethyl poly(ethyleneoxide) vinyl ether; pentafluoro styrene; fluoroalkyl styrene; vinylidene fluoride; fluorinated α-olefins; perfluorobutadiene; 1-fluoroalkylperfluorobutadiene; (ω-H-perfluoroalkanediol di(meth)acrylate; and β-substituted fluoroalkyl (meth) acrylate. Preferred fluorinated monomers have a fluoroalkyl group having from 4 to 20 carbon atoms.

In addition silane and siloxane functional monomers such, for example, octamethyl tetracyclosiloxane (known as D4), may be incorporated into the polymer.

The monomers used to prepare the polymer that will form the polymerized phase of the porous particles of the present invention may also be used as "preseed monomers" and "seed monomers" to form the pre-seed and seed particles, respectively, of the present invention.

Initiation of free radical polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof. Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/ sodium formaldehyde sulfoxylate/Fe(III) and ammonium persulfate/sodium bisulfite/sodium hydrosulfite/Fe(III). Preferred halogenated initiators include trichloroacetyl peroxide, bis(perfluoro-2- propoxy propionyl peroxide, perfluoropropionyl peroxide, perfluoroazoisopropane, and hexafluoropropylene trimer radical. The choice of polymerization temperature depends upon free radical initiator decomposition constant.

Formation of the polymer of the present invention may alternatively be achieved by condensation polymerization. Typically, a condensation polymer is formed as the product of reaction between a first multifunctional monomer and a second multifunctional monomer. An example of such a reactive pair is paraphenylene diisocyanate and hexamethylene diamine. Crosslinking may be achieved by incorporating, for example, trifunctional monomers such as diethylene triamine. Other suitable monomers and methods for preparing condensation polymers therefrom can be found in U.S. Pat. No. 4,360,376 and U.S. Pat. No. 3,577,515. The preferred method for preparing the condensation polymers is to first incorporate the first multifunctional monomer into the droplet medium, and then add the second multifunctional monomer. Reaction to form the condensation polymer then occurs as the second multifunctional monomer reaches the surfaces of the droplets. Because these reactions are usually fast, the polymer is formed at the interface between droplet and water. As such, this preferred form of condensation reaction is known in the art as "interfacial polycondensation".

Replacement gases include argon, helium, nitrogen, oxygen, carbon dioxide, and mixtures thereof. Air is a specific example of such a mixture. Air includes nitrogen, oxygen, and carbon dioxide at approximately 78, 21, and 0.03 percent by volume, based on the volume of air. During complete or partial removal of the fugitive substance, a replacement gas may be introduced to the pressure vessel to at least partially replace the exiting fugitive substance.

Once the aqueous dispersion of a plurality of porous particles of the present invention has been prepared, the pore filling phase typically remains for at least one hour at one atmosphere, preferably for at least week, more preferably for at least one month, and most preferably for at least one year.

Unwanted components of the aqueous dispersion of the present invention may removed by techniques well known in the art, such as, for example, diafiltration.

When a single polymeric phase is present in the porous particles of the aqueous dispersion of the present invention, that polymeric phase has the following "effective Tg" range: the lower limit is typically at least 5° C. above the freezing point of the aqueous phase, and, preferably, the lower limit of the effective Tg range is 10° C., more preferably 30° C., and most preferably 50° C.; the upper limit is only limited by the Tg of the polymeric phase, and is typically 350° C., preferably 250° C., more preferably 175° C., and most preferably 125° C. When there is more than one polymeric phase in the porous particles of the present invention, at least one polymeric phase must have an effective Tg within the ranges just stated.

The same ranges for effective Tg stated supra apply to the polymeric phase of the porous particles of the present invention after isolation from the aqueous dispersion. When the porous particles are isolated from the aqueous phase, it is preferred that such isolation occur at a temperature at least 3° C. below the effective Tg of the polymeric phase having the highest effective Tg. If, however, isolation from the aqueous phase is carried out after combining the aqueous dispersion of the present invention with a second aqueous dispersion containing, for example, a polymer having an effective Tg greater than that of the polymeric phase of the porous particles of the present invention, it may be possible to carry out isolation at a temperature greater than the effective Tg of the polymeric phase of the porous particles and, preferably, less that the effective Tg of the polymer of the second aqueous dispersion. Alternatively, the polymer having as effective Tg greater than that of the polymeric phase of the porous particles may be added to the aqueous dispersion in any form that will disperse, e.g., as a solid dispersible powder.

The plural porous particles may be isolated from the aqueous dispersion of the present invention by methods well known in the art, including, for example, filtration followed by air, or oven drying; formation of a film of the aqueous dispersion, followed by air, or oven drying; coagulation followed by air, or oven drying; and spray drying. Isolation may include the further step of combining the aqueous dispersion of the present invention with at least one second aqueous dispersion or solution containing at least one component, for example, a polymer, or other additive. Alternatively, such components may be added as the pure component or as mixtures of more than one component. The isolation may further include a step of at least partially removing residual ingredients and impurities (e.g., initiator fragments and dispersing agents) from the aqueous phase by techniques well known in the art, such as diafiltration. When the porous particles of the present invention are isolated as a powder (i.e., the neat particles), isolation should be carried out at a temperature below the Tg of at least one polymeric phase. The isolated porous particles have the same, or slightly smaller, average particle size and the same PSD polydispersity as they had in their aqueous dispersions. The average particle size of the isolated porous particles might, for example, be slightly smaller than the average particle size for the porous particles before isolation from the aqueous dispersion if the polymeric phase of the porous particles had been swollen with a substance (e.g., fugitive substance, or water) that later evaporated, or was otherwise removed, from the particles during or after isolation.

The plural porous particles of the present invention are useful as components of many systems. A non-exhaustive list of such systems includes, for example, paints, coatings, inks, sunscreens, and paper. The plural porous particles of the present invention are further useful as image enhancers for ultrasonic imaging. Though not wishing to be bound be any particular theory, it is believed that the differences in elasticity among the replacement gas (e.g., air; fluorocarbon), the polymeric shell of the porous particle, and water result in ultrasonic scattering which enhances contrast during, for example, medical imaging.

EXAMPLES

TL205 is a liquid crystal mixture (fluorinated type) available from E. Merck, ltd., Poole, England.

DOSS is dioctyl sulfosuccinate, available as a 75% solution in water/EtOH.

DI water is deionized water.

NDDS is sodium dodecylbenzenesulfonate (10% aqueous).

Mondur MRS is an aliphatic isocyanate available from Miles Chemical Company, Newhall, Calif.

partially methylated beta-cyclodextrin (50.8% by weight solution in water) is available from Wacker Biochem Corp., Eddyville, Iowa.

Method for Analyzing Aqueous Dispersions of Polymer Particles for Average Particle Size (PS) and Particle Size Distribution (PSD) Using the Chemical Process Specialists Disc Centrifuge Photosedimentation (DCP) Unit.

The DCP unit can measure particles having sizes in the range of 0.01 micron to 40 microns, and is most effective in the 0.025 to 20 micron range. The analyzer measures particle size distribution using centrifugal sedimentation of the particles within an optically clear spinning disc that is filled with fluid. Sedimentation is stabilized by a density gradient within the fluid and accuracy of measured sizes is insured through the use of a calibration standard having known average PS and PSD before each analysis.

Fluids of various densities are prepared by dissolving sucrose and an anionic surfactant in deionized water. Nine of these gradient fluids (1.5 ml each) are prepared at sucrose weight percents, based on total solution, of 0 to 8, in increments of 1 weight percent. The gradient fluids are then injected into the rotating disc, beginning with the most concentrated sucrose solution, followed by the next highest concentration, and continuing in this way until the gradient fluid containing no sucrose has been added. Each day, a calibration standard is measured as a check on the system. Typically, a 600 nm (=0.600$\mu$) polystyrene standard (available from Duke Scientific) is run before each sample analysis. Larger or smaller standards may also be run, particularly when the sample particle size differs greatly from 600 nm.

Each aqueous dispersion of polymeric particles is diluted with a sample dilution fluid prior to analysis. The sample dilution fluid is 8% ethanol in deionized water plus anionic surfactant. The diluted standard is prepared by adding 2 drops of 600 nm standard to 10 cc of the sample dilution fluid. The diluted standard is shaken for 10–20 seconds and then a 1 cc aliquot is injected into the rotating disc. The diluted sample is similarly prepared by adding 3–5 drops (depending on the % total solids) to 10 cc of the sample dilution fluid. The diluted sample is shaken for 10–20 seconds and checked visually to assure that the particles are completely dispersed, and then a 1 cc aliquot is injected into the rotating disc. If necessary, the diluted sample can be sonicated to be sure it is completely dispersed. No filtering of the sample is necessary before injecting into the disc.

The concentration of particles at each size is determined by continuously measuring the turbidity of fluid near the outside edge of the rotating discs. The turbidity measurements are converted to a weight distribution using well known Mie Theory light scattering calculations. The weight distribution is converted to a surface area or number distribution if required.

Method for Analyzing Aqueous Dispersions of Polymer Particles for Average Particle Size (PS) Using a Brookhaven BI-90 Particle Sizer.

The particle diameter of the particles was determined using a Brookhaven BI-90 Particle Sizer which employs a light scattering technique. To measure the average particle size a sample of 0.1 to 0.2 grams of as is aqueous dispersion was diluted to a total of 40 cc with distilled water. A 2 cc portion was delivered into an acrylic cell which was then capped. The average particle size was measured for 1000 cycles. The measurement was repeated three times and the average of three values was reported in nanometers.

Molecular Weight Determination Using Gel Permeation Chromatography (GPC)

Gel Permeation Chromatography, otherwise known as size exclusion chromatography, actually separates the members of a distribution according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p.81–84.

For example, the molecular weight information for a low molecular weight sample (e.g., 10,000) may be determined as follows: The sample (an aqueous emulsion containing low molecular weight particles) is dissolved in THF at a concentration of approximately 0.1% weight sample per volume THF, and shaken for 6 hours, followed by filtration through a 0.45 $\mu$m PTFE (polytetrafluoroethylene) membrane filter. The analysis is performed by injecting 100 $\mu$l of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system was calibrated with narrow polystyrene standards. PMMA-equivalent molecular weights for the sample are calculated via Mark-Houwink correction using $K=14.1\times10^{-3}$ ml/g and $a=0.70$ for the polystyrene standards and $K=10.4\times10-3$ ml/g and $a=0.697$ for the sample.

Optical Microscopy: Voids in Oil Test

The presence of air-filled voids in the porous particles was determined using a Leitz Orthoplan microscope. Approximately 0.3–0.4 gram of the gas filled polymer particles was weighed into a suitable container and mixed with 10 grams of water. One to two drops of resultant dilute dispersion was smeared onto a glass microscope slide, taking care to produce as thin a wet film as possible. The microscope slide was then dried at room temperature and low humidity (<30% relative humidity) for 30 minutes. One drop of non-drying type B immersion oil was applied to the dry film of polymer particles. The particles and oil were next covered with a thin cover glass and viewed at a magnification of 2300X. A portion of the viewing field was located that contained a monolayer of particles. The refractive indices of the immersion oil and the polymer particles were very similar (~1.5) although very different from that of air (1.0). Because of these similar refractive indices, the oil rendered the polymer very difficult to see, while any air-filled voids (pores) in the polymeric particles were seen as dark spots.

Example 1.

Preparation of low Molecular Weight Seed Particles

A 3-liter round bottom flask with 4 necks was equipped with paddle stirrer, thermometer, nitrogen inlet, and reflux condenser. Deionized water, 1500 grams, was added to the flask and heated to 85° C. under a nitrogen atmosphere. To the 1500 grams of deionized water in the flask were added 3.0 grams of sodium persulfate dissolved in 30.0 grams of water and 40 grams of an acrylic seed latex having a solids content of 46.5% and an average particle diameter of 95 nm. A monomer emulsion (ME) prepared by mixing 140 grams of deionized water, 6.0 grams of sodium dodecylbenzene-sulfonate (SDS, 23%), 360.0 grams of isobutyl methacrylate, and 40 grams of n-dodecyl mercaptan was added over 2 hours along with 3 grams of sodium persulfate dissolved in 80 grams of water at a temperature of 85° C. The resultant latex was held at 85° C. for 30 minutes, cooled and filtered through a 100 mesh screen. The resultant polymer had a solids content of 18.1%, average particle diameter (as measured by BI-90 light scatter) of 290 nanometers, and a number average molecular weight of 2000 as measured by gel permeation chromatography.

Example 2

Preparation of Seed Particles by Polymerization of D4

A 1-liter round bottom flask with 4 necks was equipped with paddle stirrer, thermometer, nitrogen sparge, and reflux condenser. To the flask was added 350 grams of deionized water, 1.0 gram of sodium dodecylbenzenesulfonate (SDS, 23%), a mixture of 4.0 grams of dodecylbenzene sulfonic acid and 50 grams of deionized water, and 100 grams of D4 (Octamethyl tetracyclosiloxane). The contents of the flask were purged with nitrogen for 30 minutes at 25° C. and then heated to 80° C. The reaction was held at 800 for 20 hours, then cooled and filtered through a 100 mesh screen to remove any coagulum. The resultant polymer had a solids content of 16.8% and an average particle diameter (as measured by BI-90 light scatter) of 175 nanometers.

Example 3

Preparation of Gas Filled Porous Particles Having a Narrow PSD Using Supercritical Carbon Dioxide An emulsion of 12.0 grams of deionized water, 1.25 grams of the low molecular weight seed polymer prepared in Example 1, 0.04 grams of sodium dodecylbenzene sulfonate, 3.92 grams of methyl methacrylate, and 0.08 grams of methacrylic acid was prepared and stirred at room temperature for 30 minutes. The emulsion was then added to a 25 ml stainless steel cylindrical pressure cell. The cell was then pressurized to 10,300 kPa with supercritical carbon dioxide ($CO_2$). A solution of 0.025 grams of potassium persulfate in 1.0 gram of deionized water was added to a small additive vessel that was connected to the pressure cell and the additive vessel then pressurized to ~35,000 kPa. The potassium persulfate solution in the additive vessel was then introduced into the pressure cell and the pressure in the cell adjusted to 21,700 kPa. The contents of the cell were allowed to react for 70 minutes at 80–81° C. After the 70 minute hold, the cell was cooled to room temperature and the pressure in the cell was slowly vented to atmospheric. The contents of the cell were filtered through a 100 mesh screen to remove any coagulum. The aqueous emulsion contained gas filled polymer particles as seen with the optical microscopy voids-in-oil test mentioned previously. The gas filled polymer particles have an average particle size (by BI-90 Particle Sizer) of ~400 nm and a solids content of 19.0%.

Example 4

Preparation of Gas Filled Porous Particles Having a Narrow PSD Using Supercritical Carbon Dioxide An emulsion of 12.0 grams of deionized water, 1.25 grams of the low molecular weight seed polymer prepared in Example 1, 0.04 grams of sodium dodecylbenzene sulfonate, 3.92 grams of methyl methacrylate, and 0.08 grams of methacrylic acid was prepared and stirred at room temperature for 30 minutes. The emulsion was then added to a 25 ml stainless steel cylindrical pressure cell. A solution of 0.025 ammonium persulfate in 2.5 grams of deionized water was also prepared and added to the pressure cell. The contents of the cell were heated to 33° C. and the cell then pressurized to 9,650 kPa with supercritical $CO_2$. The pressure cell was then carefully heated to 80° over 35 minutes. The pressure in the cell increased to 31,700 kPa. The reaction was held for 90 minutes at 80° C. and a pressure of ~27,500 kPa. The cell was then cooled to room temperature and the pressure in the cell was slowly vented to atmospheric. The contents of the cell were filtered through a 100 mesh screen to remove any coagulum. The aqueous emulsion contained gas filled polymer particles as seen with the optical microscopy voids-in-oil test mentioned previously. The gas filled polymer particles have an average particle size (by BI-90 Particle Sizer) of ~400 nm and a solids content of 13.0%.

Example 5

Preparation of Gas Filled Porous Particles Using Supercritical Carbon Dioxide

An emulsion of 12.0 grams of deionized water, 1.31 grams of the seed polymer prepared in Example 2, 0.05 grams of sodium dodecylbenzene sulfonate, 3.92 grams of methyl methacrylate, and 0.08 grams of methacrylic acid was prepared and stirred at room temperature for 30 minutes. The emulsion was then added to a 25 ml stainless steel cylindrical pressure cell. A solution of 0.040 ammonium persulfate and 1.0 gram of deionized water was also prepared and added to the pressure cell. The contents of the cell were purged with nitrogen for 30 minutes. The cell was then pressurized to 7,380 kPa with $CO_2$. The pressure cell was then carefully heated to 850 over 90 minutes. The pressure in the cell increased to 26,200 kPa. The reaction was held for 60 minutes at 84–85° C. and a pressure of ~26,500 kPa. The cell was then cooled to room temperature and the pressure in the cell was slowly vented to atmospheric. The contents of the cell were filtered through a 100 mesh screen to remove any coagulum. The aqueous emulsion contained gas filled polymer particles as seen with the optical microscopy voids in oil test mentioned previously. The gas filled polymer particles have an average particle size (by BI-90 Particle Sizer) of 400 nm and a solids content of 19.5%.

Example 6

Preparation of a low Molecular Weight Seed by First Forming an in-Situ pre-Seed

This method (Example 1 of U.S. Pat. No. 5,237,004) can be used to prepare low molecular weight seed particles by first forming pre-seed particles "in-situ". To a reactor equipped with a stirrer and condenser and blanketed with nitrogen was added a solution of 0.24 g calcium carbonate in 324 g deionized water. The reactor and contents were then heated to 87° C. To the stirred reactor contents were then added a mixture of 9.2 g butyl acrylate, 2.1 g styrene, 2.7 g of n-octyl mercaptan, 0.74 g of 10% aqueous sodium dodecylbenzenesulfonate and 2.7 g deionized water, and a solution of 0.028 g potassium persulfate in 2.8 g of deionized water. The reactor contents were then stirred for 30 minutes, after which a mixture of 122.8 g butyl acrylate, 12.9 g styrene, 35.3 g of n-octyl mercaptan, 9.86 g of 10% aqueous sodium dodecylbenzenesulfonate and 35.3 g of deionized water, and a solution of 0.011 g potassium persulfate in 16.6 g of deionized water were added, with stirring, over a period of 90 minutes. The reactor contents were maintained at 87° C. with stirring for 50 minutes, after which the resulting emulsion was cooled to room temperature. The butyl acrylate-styrene particles should have an average PS=$0.3\mu$ and a PSD of 1.01 or less as measured by DCP.

Example 7

Preparation of Crosslinked pre-Seed Particles

This method (Example 1 of U.S. Pat No. 5,237,004) can be used to prepare crosslinked pre-seed particles. To a reactor equipped with stirrer and condenser was added 208 g deionized water and 0.38 g of sodium carbonate. The contents of the reactor were heated to 82° C., then an emulsified mixture of 14.7 g butyl acrylate, 0.038 g butylene glycol diacrylate, 0.3 g allyl methacrylate, 0.6 g sodium dodecylbenzenesulfonate (10% aqueous), and 6 g deionized water were added to the reactor. A solution of 0.0094 g potassium persulfate in 5.25 g deionized water was also added, followed by stirring for 1 hour at 82° C. Both an emulsified mixture of 83.3 g butyl acrylate, 0.212 g butylene glycol diacrylate, 1.7 g allyl methacrylate, 3.4 g sodium dodecylbenzenesulfonate (10% aqueous), and 34 g deionized water, and a solution of 0.0536 g potassium persulfate in 29.75 g deionized water were added to the reactor gradually during 90 minutes at 82° C. Stirring was continued for two more hours at 82° C., followed by cooling the reactor contents to room temperature. The pre-seed particles have an average PS of $0.2\mu$ as measured by BI-90 Nanosizer. The pre-seed particles should have an average PS of $0.2\mu$ and a PSD polydispersity of between 1.00 and 1.10 as measured by DCP.

Example 8

Preparation of low Molecular Weight Seed Particles From Previously Prepared pre-seed Particles This method (Example 1 of U.S. Pat. No. 5,237,004) can be used to prepare low molecular weight seed particles from crosslinked pre-seed particles. To a reactor equipped with stirrer and condenser and blanketed with nitrogen was added a solution of 0.081 g sodium carbonate in 185 g deionized water and 35 g of the emulsion prepared in Example 7. The contents of the reactor were heated to 88° C. with stirring. The following ingredients were then added gradually during 3 hours at 88° C.: an emulsion of 82 g butyl acrylate, 18 g styrene, 2.5 g of a 10% aqueous solution of sodium dodecylbenzenesulfonate (NDDS), and 32 g deionized water; an emulsion of 19 g 1-hexanethiol, 2.8 g of a 10% aqueous solution of NDDS, and 11 g deionized water; and a solution of 0.11 g potassium persulfate in 18 g deionized water. The contents of the reactor were then heated with stirring for another 90 minutes, followed by cooling to 65° C. A solution of 0.18 g t-butyl hydroperoxide in 3.7 g water, and 4.1 g of a 3% aqueous solution of sodium formaldehyde was then added, followed by stirring for 1 hour at 65° C. The contents of the reactor were then cooled to room temperature. The seed particles have an averager size of $0.5\mu$ as measured by BI-90 Nanosizer. The seed particles should have an average PS of $0.5\mu$ and a PSD polydispersity of 1.002 as measured by DCP. The seed particles have a number average molecular weight of 2,000.

Example 9

Preparation of air Filled Porous Particles Having a Very Narrow PSD Using Supercritical Carbon Dioxide An emulsion of 12.0 grams of deionized water, 1.25 grams of the low molecular weight seed latex of Example 8 adjusted to 18% solids, 0.04 grams of sodium dodecylbenzene sulfonate, 3.92 grams of methyl methacrylate, and 0.08 grams of methacrylic acid is prepared and stirred at room temperature for 30 minutes. The emulsion is then added to a 25 ml stainless steel cylindrical pressure cell. The cell is then pressurized to 10,340 kPa with supercritical carbon dioxide ($CO_2$). A solution of 0.025 grams of potassium persulfate in 1.0 gram of deionized water is added to a small additive vessel that is connected to the pressure cell and the additive vessel is then pressurized to ~34,500 kPa. The potassium persulfate solution in the additive vessel is then introduced into the pressure cell, and the pressure in the cell is adjusted to 21,700 kPa. The contents of the cell are allowed to react for 70 minutes at 80–81° C. After the 70 minute hold, the cell is cooled to 35° C., and the pressure in the cell is slowly vented until the internal pressure equals atmospheric pressure. The contents of the cell are then cooled to room temperature, and filtered through a 100 mesh screen to remove any coagulum. The aqueous emulsion should contain gas filled polymer particles as seen with the optical microscopy voids-in-oil test. The gas filled polymer particles should have an average PS of 0.790μ, a PSD polydispersity of 1.004 as determined by DCP, and a solids content of ~19.0%.

Example 10

Preparation of air Filled Porous Particles Having a Very Narrow PSD Using Condensation Polymerization in Presence of Supercritical Carbon Dioxide An emulsion of 12.0 grams of deionized water, 1.25 grams of the low molecular weight seed latex prepared in Example 1, 0.04 grams of sodium dodecylbenzene sulfonate, 3.46 g Mondur MRS aliphatic isocyanate (Miles Inc.), and 0.4 g partially methylated beta-cyclodextrin (Wacker, 50.8% by weight solution in water) is prepared and emulsified using a homogenizer during 5 minutes. The emulsion is then added to a 25 ml stainless steel cylindrical pressure cell. The contents of the cell are heated to 35° C., and then the cell is pressurized to 22,000 kPa with supercritical carbon dioxide. A solution of 0.29 g ethylene diamine and 0.35 g tetraethylene pentaamine is then added gradually to the cell during 15 minutes, followed by stirring for 1 hour. The carbon dioxide is then vented to 1 atmosphere, followed by cooling to room temperature. The contents of the cell are filtered through a 100 mesh screen to remove any coagulum. The aqueous emulsion contains gas filled polymer particles as seen with the optical microscopy voids-in-oil test. The gas filled polymer particles should have an average PS of ~400 nm, a PSD polydispersity of ~1.01 as determined by DCP, and a solids content of 19.0%.

Example 11

Preparation of gas Filled Porous Particles Having a Broad Particle Size Distribution Using Supercritical Carbon Dioxide An emulsion of 12.0 grams of deionized water, 0.05 grams of sodium dodecylbenzene sulfonate, 5.14 grams of methyl methacrylate, and 0.11 grams of methacrylic acid is prepared and stirred at room temperature for 30 minutes. The emulsion is then added to a 25 ml stainless steel cylindrical pressure cell. A solution of 0.025 ammonium persulfate in 2.5 grams of deionized water is also prepared and added to the pressure cell. The contents of the cell are heated, with stirring, to 33° C., and the cell is then pressurized to 9,650 kPa with supercritical $CO_2$. The pressure cell is then carefully heated, with stirring, to 80° C. over 35 minutes. The pressure in the cell increases to 31,700 kPa. The contents of the reactor are stirred for 90 minutes at 80° C. and a pressure of ~27,500 kPa. The cell is then cooled to 35° C., and the carbon dioxide in the cell is slowly vented until the internal pressure of the reactor is equal to atmospheric pressure. The cell is then cooled to room temperature. The contents of the cell are filtered through a 100 mesh screen to remove any coagulum. The pores of the porous particles should be air filled as determined by the optical microscopy voids-in-oil test. The gas filled polymeric particles should have an average particle size of 0.4μ and a PSD polydispersity of ~2 as determined by DCP. The solids content of the emulsion of the porous particles should be 13.0% by weight.

Example 12

Preparation of gas Filled Porous Particles Having a Broad Particle Size Distribution by Condensation Polymerization Using Supercritical Carbon Dioxide An emulsion of 12.0 grams of deionized water, 0.1 grams of sodium dodecylbenzene sulfonate, and 3.46 g Mondur MRS aliphatic isocyanate (Miles Inc.) is prepared and emulsified using a homogenizer during 1 minute. The emulsion is immediately added to a 25 ml stainless steel cylindrical pressure vessel, and the contents of the vessel are immediately heated to 35° C. The vessel is then pressurized to 22,000 kPa with supercritical carbon dioxide. A solution of 0.30 g ethylene diamine and 0.34 g tetraethylene pentaamine is then added gradually to the pressure vessel during 15 minutes, followed by agitation for an additional hour. The carbon dioxide is then vented until the interior pressure of the pressure vessel is approximately one atmosphere, followed by cooling to room temperature. The contents of the vessel are filtered through a 100 mesh screen to remove any coagulum. The aqueous emulsion contains porous particles, the pores of which contain a gaseous phase as seen with the optical microscopy voids-in-oil test. The gas filled polymer particles should have an average PS of ~500 nm, a PSD polydispersity of ~2 by DCP, and a solids content of 19.0%.

I claim:

1. A method of preparing an aqueous dispersion of a plurality of porous particles, wherein said porous particles comprise at least one polymeric phase and a pore filling phase, comprising the steps of:
    a) forming a reaction mixture in a closed pressure vessel, said reaction mixture comprising:
        i) at least one monomer;
        ii) water;
        iii) a dispersing agent; and
        iv) at least one fugitive substance;
    b) forming a plurality of droplets comprising said monomer and said fugitive substance as a dispersed phase in water;
    c) polymerizing said monomer to form said polymeric phase;
    d) causing said polymeric phase and said pore filling phase to phase separate from one another, forming said porous particles; and
    e) reducing the pressure in said pressure vessel to atmospheric pressure; and
wherein said pore filling phase comprises said fugitive substance.

2. The method of claim 1,
    wherein said monomer of said step of forming a reaction mixture is an ethylenically unsaturated monomer; and
    wherein said reaction mixture of said step of forming a reaction mixture further comprises an initiator.

3. The method of claim 1, further comprising the step of at least partially replacing said fugitive substance with a replacement gas.

4. The method of claim 3, wherein said replacement gas is a gas selected from the group consisting of argon, helium, nitrogen, oxygen, carbon dioxide, and mixtures thereof.

5. The method of claim 1, wherein said fugitive substance is a substance selected from the group consisting of 2,2-dimethylpropane, dichlorofluoromethane, 1,2-dichlorotetrafluoroethane, butane, 1,1,2,2-tetrafluoroethane, dimethyl ether, 1,1-difluoroethane, octafluoropropane, chlorodifluoromethane, propane, pentafluoroethane, difluoromethane, hexafluoroethane, carbon dioxide, chlorotrifluoromethane, trifluoromethane, ethane, tetrafluoromethane, methane, and combinations thereof.

6. The method of claim 1, wherein said fugitive substance is carbon dioxide.

7. The method of claim 1, further comprising the step of isolating said porous particles.

8. The method of claim 1,
    further comprising the step of forming a plurality of seed particles by at least one aqueous emulsion polymerization of at least one seed monomer; and wherein said reaction mixture further comprises said seed particles.

9. The method of claim 1, further comprising the steps of:
(1) forming a plurality of pre-seed particles by aqueous emulsion polymerization of at least one pre-seed monomer; and
(2) forming a plurality of seed particles by at least one aqueous polymerization of at least one seed monomer in the presence of said pre-seed particles;
wherein the seed polymer formed by said polymerization of said seed monomer has a number average molecular weight of 500 to 50,000; and
wherein said reaction mixture further comprises said seed particles.

10. The method of claim 1, 8, or 9, wherein said reaction mixture further comprises at least one transport agent.

11. The method of claim 10, wherein said transport agent is a transport agent selected from the group consisting of cycloinulohexose, cycloinuloheptose, cycloinuloctose, a calyxarene, a cavitand, a cyclodextrin, and mixtures thereof.

12. The method of claim 11, wherein said cyclodextrin is a cyclodextrin selected from the group consisting of partially methyl substituted α-cyclodextrins, partially methyl substituted β-cyclodextrins, partially methyl substituted γ-cyclodextrins, and mixtures thereof.

13. The method of claim 1, wherein said monomer is at least one first multifunctional monomer; and wherein said reaction mixture further comprises at least one second multifunctional monomer reactive with said first multifunctional monomer to form a condensation polymer.

14. The method of claim 1, 8, or 9, wherein said polymerizing is carried out at a pressure greater than the critical pressure of the fugitive substance and at a temperature greater than the critical temperature of the fugitive substance.

15. The method of claim 1, 8, or 9, wherein said step of said reducing the pressure occurs at a temperature below the effective glass transition temperature of at least one said polymeric phase.

16. The method of claim 1, 8, or 9, wherein said step of said reducing the pressure is comprised of the sequential steps of:
(1) partially reducing said pressure at a temperature at least as high as the effective glass transition temperature of said polymeric phase; and
(2) reducing the remainder of said pressure at a temperature below said effective glass transition temperature of at least one said polymeric phase.

17. An aqueous dispersion of a plurality of porous particles, said porous particles comprising:
a) at least one polymeric phase; and
b) a pore filling phase;
wherein said pore filling phase comprises a substance selected from the group consisting of a fugitive substance, a replacement gas, and combinations thereof.

18. The aqueous dispersion of claim 17, wherein said pore filling phase remains in said porous particles for at least one hour.

19. The aqueous dispersion of claim 17, wherein the effective glass transition temperature of said polymeric phase is 5° C. above the freezing point of the aqueous phase to 50° C.

20. The aqueous dispersion of claim 17, wherein the effective glass transition temperature of said polymeric phase is 30° C. to 50° C.

21. The aqueous dispersion of claim 17, wherein said porous particles have an average particle size of 0.15μ to 15μ.

22. The aqueous dispersion of claim 17, wherein said porous particles have an average particle size of 0.15μ to 1μ.

23. A plurality of porous particles, said porous particles comprising:
a) at least one polymeric phase; and
b) a pore filling phase;
wherein said pore filling phase comprises a substance selected from the group consisting of a fugitive substance, a replacement gas, and combinations thereof; and
wherein the effective glass transition temperature of the polymeric phase is 10° C. to 50° C.

24. The porous particles of claim 23, wherein said effective glass transition temperature is 30° C. to 50° C.

25. The porous particles of claim 23, wherein said porous particles have an average particle size of 0.15μ to 250μ.

26. The porous particles of claim 23, wherein said porous particles have an average particle size of 0.15μ to 15μ.

27. The porous particles of claim 23, wherein said porous particles have an average particle size of 0.15μ to 1μ.

* * * * *